(12) United States Patent
Hartig et al.

(10) Patent No.: US 8,519,043 B2
(45) Date of Patent: *Aug. 27, 2013

(54) POLYMER DISPERSIONS

(75) Inventors: Jens Hartig, Ludwigshafen (DE); Roelof Balk, Boehl-Iggelheim (DE); Manfred Dargatz, Worms (DE)

(73) Assignee: BASF SE, Ludwigshafen (DE)

( * ) Notice: Subject to any disclaimer, the term of this patent is extended or adjusted under 35 U.S.C. 154(b) by 187 days.

This patent is subject to a terminal disclaimer.

(21) Appl. No.: 12/971,658

(22) Filed: Dec. 17, 2010

(65) Prior Publication Data

US 2011/0152441 A1 Jun. 23, 2011

Related U.S. Application Data

(60) Provisional application No. 61/287,720, filed on Dec. 18, 2009.

(51) Int. Cl.
*C08F 2/16* (2006.01)
*C08K 3/20* (2006.01)
*C08L 11/02* (2006.01)

(52) U.S. Cl.
USPC ............ 524/458; 427/385.5; 427/388.1; 523/201; 524/460; 524/515; 524/517; 524/521; 524/523

(58) Field of Classification Search
USPC ............ 523/201; 524/458, 515, 523, 460, 524/517, 521; 427/385.5, 388.1
See application file for complete search history.

(56) References Cited

U.S. PATENT DOCUMENTS

| 3,804,881 | A | 4/1974 | Bassett et al. |
|---|---|---|---|
| 3,957,711 | A | 5/1976 | Powanda et al. |
| 6,391,973 | B1 | 5/2002 | Law et al. |
| 7,317,056 | B2 | 1/2008 | Yoshimura et al. |
| 2001/0056154 | A1* | 12/2001 | Blum et al. .................. 524/522 |
| 2003/0050385 | A1* | 3/2003 | Probst et al. .................. 524/505 |
| 2005/0245661 | A1* | 11/2005 | Kodama et al. ............... 524/457 |
| 2006/0247357 | A1 | 11/2006 | Willems et al. |

FOREIGN PATENT DOCUMENTS

| EP | 0 853 636 B1 | 7/1998 |
|---|---|---|
| EP | 1 602 701 A1 | 12/2005 |
| JP | 2007-45948 | 2/2007 |
| WO | WO 00/05276 | 2/2000 |
| WO | WO 02/08297 A2 | 1/2002 |
| WO | WO 2006/054611 A1 | 5/2006 |
| WO | WO 2006/118974 A1 | 11/2006 |
| WO | WO 2011/009838 A2 | 1/2011 |

OTHER PUBLICATIONS

U.S. Appl. No. 13/384,607, filed Jan. 18, 2012, Balk, et al.
International Search Report and Written Opinion issued Jul. 14, 2011 in Application No. PCT/EP2010/069959 (With English Translation of Category of Cited Documents).
U.S. Appl. No. 13/237,621, filed Sep. 20, 2011, Gerst, et al.
U.S. Appl. No. 12/991,623, filed Nov. 8, 2010, Balk, et al.
Search Report issued Mar. 24, 2010 in Europe Application No. 09 17 9971 (With English Translation of Category of Cited Documents).
Ganghua Teng, et al., "Effect of Introduction Mode of Hydroxyl Functionality on Morphology and Film Properties of Cycloaliphatic Diepoxide Crosslinkable Core-Shell Latex", Journal of Polymer Science: Part A: Polymer Chemistry, vol. 40, 2002, pp. 4256-4265.
E. P. Pedraza, et al., "Effect of functional monomer on the stability and film properties of thermosetting core-shell latexes", Polymer, vol. 46, No. 24, 2005, pp. 11174-11185.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

The present invention relates to coating compositions which comprise dispersions of polymers obtained by a two-stage procedure, to processes for preparing them, and to their use.

14 Claims, No Drawings

POLYMER DISPERSIONS

The present invention relates to coating compositions which comprise dispersions of polymers obtained by a two-stage procedure, to processes for preparing them, and to their use.

U.S. Pat. No. 3,957,711 describes single-stage polymers having a hydroxyalkyl (meth)acrylate as protective colloid, which is prepared in situ and followed by the polymerization of other monomers.

U.S. Pat. No. 7,317,056 describes polymers prepared by a two-stage procedure and intended for pressure-sensitive adhesives, the first stage of the procedure involving the incorporation, by polymerization, of a high fraction of acrylic acid and hydroxyalkyl acrylates. The by the process described therein exhibit a high viscosity, and this necessitates a reduction in the solids fraction of the completed dispersion.

E. P. Pedraza and M. D. Soucek in Polymer (2005), 46 (24), 11174-85 described latices composed of core-shell polymers whose core is composed of (meth)acrylates and hydroxyethyl methacrylate and whose shell is composed of (meth)acrylates and methacrylic acid. The polymerization yields large particles having an average size of more than 300 nm and in some cases a bimodal particle-size distribution.

A disadvantage is that, according to the teaching of that paper, a high fraction of more than 4% of emulsifiers is necessary, based on the sum of the monomers employed.

G. Teng and M. D. Soucek in Journal of Polymer Science: Part A: Polymer Chemistry, Vol. 40, 4256-4265 (2002) describe latices composed of core-shell polymers whose cores and shells are each composed either of (meth)acrylates or of (meth)acrylates and hydroxyethyl methacrylate. The polymerization yields large particles having an average size of more than 250 nm.

A disadvantage here again is that, according to the teaching of that paper, a high fraction of more than 4% of emulsifiers is needed, based on the sum of the monomers employed.

EP 1602701 A1 describes the polymerization of monomers in the presence of a protective colloid which is prepared from certain hydrophobic and hydrophilic monomers. A disadvantage is that, according to the teaching of that specification, a high fraction of more than 40% of hydrophilic monomers is used for the polymerization, leading to polymers having only a low level of water stability.

WO 00/5276 describes polymers prepared by a two-stage procedure in whose first stage a high fraction of acrylic acid is incorporated by polymerization. The viscosity of the by the process described therein is high, necessitating a reduction in the solids fraction of the completed dispersion.

It was an object of the present invention to provide polymer dispersions for coating compositions which can be prepared as far as possible without or with just a small amount of emulsifier, exhibit reduced viscosity, and lead to coatings having improved water stability.

This object has been achieved by means of a coating composition comprising at least one polymer dispersion obtainable by at least two-stage emulsion polymerization of
in a first stage, reaction of
(A1) at least one alkyl (meth)acrylate,
(B1) optionally at least one vinylaromatic having up to 20 C atoms,
(C1) at least one hydroxyalkyl (meth)acrylate,
(D1) optionally at least one free-radically polymerizable compound selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms,
(E1) optionally at least one α,β-ethylenically unsaturated carboxylic acid,
(F1) optionally at least one crosslinker,
(G1) optionally at least one compound selected from the group consisting of 2-(2-oxoimidazolidin-1-yl)ethyl meth(acrylate) (ureidoethyl (meth)acrylate), acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide,
(H1) optionally at least one compound having a (meth)acrylate group and an epoxy group, and
(I1) optionally at least one α,β-ethylenically unsaturated carboxamide,
in the presence of at least one initiator and optionally in the presence of at least one emulsifier and also, optionally, in the presence of at least one regulator,
with the proviso that the copolymer obtained from the first stage has
an acid number of not more than 10 mg KOH/g polymer,
a hydroxyl number of 2 to 100 mg KOH/g polymer,
a particle size of 20 to 300, preferably 30 to 200 nm, and
a weight-average molecular weight of 5000 to 200 000 g/mol,
and the sum of the monomers (C1) and (I1) is from 0.5% to 20% by weight,
followed by a free-radical polymerization, in a subsequent stage, in the presence of the copolymer prepared in the first stage, of
(A2) at least one alkyl (meth)acrylate,
(B2) optionally at least one vinylaromatic having up to 20 C atoms,
(C2) optionally at least one hydroxyalkyl (meth)acrylate,
(D2) optionally at least one free-radically polymerizable compound selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms,
(E2) optionally at least one α,β-ethylenically unsaturated carboxylic acid,
(F2) optionally at least one crosslinker, and
(G2) optionally at least one compound selected from the group consisting of 2-(2-oxoimidazolidin-1-yl)ethyl meth(acrylate) (ureidoethyl (meth)acrylate), acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide,
(H2) optionally at least one compound having a (meth)acrylate group and an epoxy group, and
(I2) optionally at least one α,β-ethylenically unsaturated carboxamide,
optionally followed by one or more further stages of a free-radical polymerization of at least one monomer,
the amount of the optional at least one emulsifier being 0% to 3.5% by weight, based on the total amount of the free-radically polymerizable monomers metered into the free-radical polymerization in all the stages,
with the proviso that
the weight ratio of the sum of the monomers of the first stage (A1) to (I1) to the sum of the monomers of the subsequent stages (A2) to (I2) is from 5:95 to 70:30,
the product obtained from the last stage has a particle size of 50 to 500 nm, the acid number of the product of the last stage is not higher than the acid number of the product of the first stage, and the hydroxyl number of the product of the last stage is not higher than the hydroxyl number of the product of the first stage.

In the polymerization it is possible in accordance with the invention to use the following monomers:

alkyl (meth)acrylates (A1) and (A2)

These include preferably those alkyl (meth)acrylates whose linear or branched alkyl radical has 1 to 20 carbon atoms, more preferably 1 to 10, very preferably 1 to 8, and more particularly 1 to 4 carbon atoms.

Examples of alkyl (meth)acrylates include methyl (meth) acrylate, ethyl (meth)acrylate, n-propyl (meth)acrylate, n-butyl (meth)acrylate, isobutyl (meth)acrylate, sec-butyl (meth) acrylate, n-pentyl (meth)acrylate, isopentyl (meth)acrylate, 2-methylbutyl (meth)acrylate, amyl (meth)acrylate, n-hexyl (meth)acrylate, 2-ethylbutyl (meth)acrylate, pentyl (meth) acrylate, n-heptyl (meth)acrylate, n-octyl (meth)acrylate, 2-ethylhexyl (meth)acrylate, 2-propylheptyl (meth)acrylate, n-decyl (meth)acrylate, undecyl (meth)acrylate, and n-dodecyl (meth)acrylate.

Preference is given to methyl methacrylate, methyl acrylate, ethyl acrylate, n-butyl acrylate, n-hexyl acrylate, n-octyl acrylate, 2-ethylhexyl acrylate, and 3-propylheptyl acrylate.

In particular, mixtures of the alkyl (meth)acrylates are also suitable.

Vinylaromatics Having up to 20 C Atoms (B1) and (B2)

These are optionally substituted aromatic systems having a vinyl group located in conjugation to the aromatic ring system.

Such substituted vinylaromatics have one or more, preferably one, linear or branched alkyl group which has 1 to 10 carbon atoms, preferably 1 to 6 and more preferably 1 to 4 carbon atoms, and may be located on the aromatic moiety or on the vinyl group. Where the substituent is located on the aromatic moiety, it may be located preferably in ortho- or para-position, more preferably in para-position, relative to the vinyl group.

Vinylaromatics contemplated include vinyltoluene, vinylnaphthalene, α- and p-methylstyrene, α-butylstyrene, 4-n-butylstyrene, 4-n-decylstyrene, and—preferably—styrene and α-methylstyrene.

Hydroxyalkyl (meth)acrylate (C1) and (C2)

The hydroxyalkyl (meth)acrylates are those (meth)acrylic esters whose alkylene group comprises one to 10, preferably 2 to 8, more preferably 2 to 6, very preferably 2 to 4, and more particularly 2 or 3 carbon atoms.

Preferred hydroxyalkyl (meth)acrylates are, for example, 2-hydroxyethyl (meth)acrylate, 2-hydroxypropyl (meth) acrylate, 3-hydroxypropyl (meth)acrylate, and 4-hydroxybutyl (meth)acrylate.

Particular preference is given to 2-hydroxyethyl (meth) acrylate and 2-hydroxypropyl (meth)acrylate, and very particular preference to 2-hydroxyethyl (meth)acrylate.

Consideration may also be given to those hydroxyalkyl (meth)acrylates which have more than one hydroxyl group, such as, for example, two to five, preferably two to four, more preferably two to three. Examples thereof are glyceryl mono (meth)acrylate, trimethylolpropane mono(meth)acrylate, pentaerythritol mono(meth)acrylate, and mono(meth)acrylates of sugar alcohols, such as sorbitol, mannitol, diglycerol, threitol, erythritol, adonitol (ribitol), arabitol (lyxitol), xylitol, dulcitol (galactitol), maltitol, and isomalt, for example.

Free-Radically Polymerizable Compound (D1) and (D2)

The compounds (D1) and (D2) are selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms, and are preferably selected from the group consisting of ethylenically unsaturated nitriles having up to 20 C atoms, and vinyl ethers of alcohols comprising 1 to 10 C atoms, and more preferably are ethylenically unsaturated nitriles having up to 20 C atoms.

Ethylenically Unsaturated Nitriles Having Up to 20 C Atoms

Examples of ethylenically unsaturated nitriles are fumaronitrile, acrylonitrile, and methacrylonitrile, preferably acrylonitrile and methacrylonitrile, and more preferably acrylonitile.

Vinyl Esters Of Carboxylic Acids Containing Up to 20 C Atoms

Vinylesters of carboxylic acids having 1 to 20 C atoms are, for example, vinyl laurate, vinyl stearate, vinyl propionate, Versatic acid vinyl esters, vinyl butyrate, and vinyl acetate, preferably vinyl acetate.

Vinyl Halides Having Up to 10 C Atoms

The vinyl halides are chloro-, fluoro- or bromo-substituted ethylenically unsaturated compounds, preferably vinyl chloride and vinylidene chloride.

Vinyl Ethers of Alcohols Comprising 1 to 10 C Atoms

Examples of vinyl ethers include methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, and n-octyl vinyl ether. Preference is given to vinyl ethers of alcohols comprising 1 to 4 C atoms.

α,β-Ethylenically Unsaturated Carboxylic Acids (E1) and (E2)

These are α,β-ethylenically unsaturated carboxylic acids having 3 to 10, preferably 3 to 6, more preferably 3 to 4 carbon atoms.

Preference is given to (meth)acrylic acid, crotonic acid or dicarboxylic acids, e.g., itaconic acid, maleic acid or fumaric acid, more preferably methacrylic acid and acrylic acid.

(Meth)acrylic acid in this description stands for methacrylic acid and acrylic acid.

Crosslinkers (F1) and (F2)

Crosslinkers are those which have at least two free-radically polymerizable double bonds, preferably 2 to 6, more preferably 2 to 4, very preferably 2 to 3, and more particularly just 2.

Examples of di- and poly(meth)acrylates include 1,2-, 1,3-, and 1,4-butanediol diacrylate, 1,2- and 1,3-propylene glycol (meth)acrylate, 1,6-hexanediol di(meth)acrylate, 1,2-ethylene glycol di(meth)acrylate, neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri (meth)acrylate, and pentaerythritol tri- and tetra(meth)acrylate.

Mention may further be made of divinylbenzene.

Particular preference is given to the crosslinkers selected from the group consisting of divinylbenzene, 1,4-butanediol diacrylate, and allyl methacrylate.

If compounds (F1) and (F2) are used, they are employed preferably in the second stage and not in the first stage; in other words, if the amount of $((F1)+(F2))\neq 0$, then preferably the amount of $(F2)\neq 0$ and $(F1)=0$.

Compounds (G1) and (G2) are selected from the group consisting of 2-(2-oxo-imidazolidin-1-yl)ethyl (meth)acrylate (ureidoethyl (meth)acrylate), N-[2-(2-oxo-oxazolidin-3-yl)ethyl]methacrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide.

Preference is given to 2-(2-oxo-imidazolidin-1-yl)ethyl (meth)acrylate, (acetoacetoxy)ethyl methacrylate, and diacetoneacrylamide, particular preference to 2-(2-oxo-imidazolidin-1-yl)ethyl (meth)acrylate and (acetoacetoxy)ethyl methacrylate, and very particular preference to diacetoneacrylamide.

If compounds (G1) and (G2) are used, they are employed preferably in the first stage and not in the second stage; in other words, if the amount of ((C1)+(G2))≠0, then preferably the amount of (G1)≠0 and (G2)=0.

(H1) and (H2)

These compounds comprise at least one compound having a (meth)acrylate group and an epoxy group. Mention may be made more particularly of glycidyl acrylate and glycidyl methacrylate, preferably glycidyl methacrylate.

(I1) and (I2)

These compounds comprise at least one α,β-ethylenically unsaturated carboxamide, preferably an amide of the carboxylic acids identified under (C1) and (C2).

Particular preference is given to (meth)acrylamide, crotonamide or amides of dicarboxylic acids, e.g., itaconamide, maleimide or fumaramide, more preferably methacrylamide and acrylamide, and very preferably acrylamide.

If compounds (I1) and (I2) are used, they are employed preferably in the first stage and not in the second stage; in other words, if the amount of ((I1)+(I2))≠0, then preferably the amount of (I1)≠0 and (I2)=0.

It is possible additionally, in minor amounts, as for example at less than 5% by weight, preferably less than 3% by weight, more preferably less than 1% by weight, and especially preferably 0% by weight, to use monomers other than those set out above, although this is less preferred.

The monomer composition of the first stage is generally as follows:

(A1) 30% to 99.5%, preferably 40% to 99%, more preferably 50% to 97% by weight of at least one alkyl (meth)acrylate,
(B1) 0% to 70%, preferably 5% to 60%, more preferably 10% to 50% by weight of at least one vinylaromatic having up to 20 C atoms,
(C1) 0.5% to 20%, preferably 1% to 15%, more preferably 3% to 10% by weight of at least one hydroxyalkyl (meth)acrylate,
(D1) 0% to 20%, preferably 0% to 10%, more preferably 0% to 5%, and very preferably 0% by weight of at least one free-radically polymerizable compound selected from the group consisting of ethylenically unsaturated nitriles having up to 20 C atoms, vinyl esters of carboxylic acids comprising up to 20 C atoms, vinyl halides having up to 10 C atoms, and vinyl ethers of alcohols comprising 1 to 10 C atoms, and
(E1) 0% to 5%, preferably 0% to 3%, more preferably 0% to 1%, very preferably 0% to 0.5%, and more particularly 0% by weight of at least one α,β-ethylenically unsaturated carboxylic acid,
(F1) 0% to 20%, preferably 0% to 10%, more preferably 0% to 5%, and very preferably 0% by weight
(G1) 0% to 20%, preferably 0% to 10%, more preferably 0% to 5%, and very preferably 0% by weight
(H1) 0% to 20%, preferably 0% to 10%, more preferably 0% to 5%, and very preferably 0% by weight
(I1) 0% to 19.5%, preferably 0% to 10%, more preferably 0% to 5%, and very preferably 0% by weight and the sum, based on the monomers used in the first stage, is always 100% by weight, and the amount of monomer (E1) is such that the polymer obtained from the first stage has an acid number of not more than 10 mg KOH/g, preferably not more than 8, more preferably not more than 5, very preferably not more than 3, more particularly not more than 1 mg KOH/g, and especially of 0 mg KOH/g, with the proviso that the sum of the monomers (C1) and (11) is from 0.5% to 20% by weight, preferably from 0.5% to 15%, more preferably from 0.5% to 10%, and very preferably from 1% to 10% by weight.

The acid number in this specification, unless indicated otherwise, is determined in accordance with DIN EN ISO 3682 (potentiometrically).

The hydroxyl number of the polymer obtained from the first stage is from 2 to 100 mg KOH/g, preferably from 5 to 80 and more preferably from 8 to 60 mg KOH/g.

The hydroxyl number in this specification, unless indicated otherwise, is determined in accordance with DIN 53240-2 (potentiometrically, with an acetylation time of 20 minutes).

The particle size of the polymer obtained from the first stage is generally from 20 to 80 nm, preferably 30 to 60 nm when working in the presence of at least one emulsifier.

If, however, no emulsifier is present, the particle size can be up to 350, preferably up to 300, more preferably up to 250 and very preferably up to 200 nm.

Particle size for the purposes of this specification refers to the weight-average diameter of the polymer particles in the dispersion (determined in accordance with ISO13321 using a High Performance Particle Sizer from Malvern at 22° C. and a wavelength of 633 nm).

The weight-average molecular weight Mw of the polymer obtained from the first stage is from 5000 to 200 000 g/mol, preferably from 7000 to 100 000, more preferably from 8000 to 50 000, and very preferably from 10 000 to 30 000.

In this specification, the weight-average molecular weight Mw, unless indicated otherwise, is determined via a size exclusion chromatography (SEC) procedure with tetrahydrofuran+0.1% by weight of trifluoroacetic acid as eluent, with a flow rate of 1 ml/min and a column temperature of 35° C. The sample is diluted in the eluent to a concentration of 2 mg/ml, and 100 μl thereof are injected after the sample solution has been filtered through a 0.2 μm filter (Sartorius Minisart SRP 25) in order to remove any gel fraction. For the columns, three columns with an internal diameter of 7.5 mm were combined as follows: 5 cm preliminary column (PIgel 10μ Guard preliminary column), followed by two 30 cm separating columns (each PIgel 10μ Mixed B). Detection took place using an Agilent 1100 differential refractometer and Agilent 1100 VWD UV photometer, PSS SLD7000-BI-MwA (UV/254 nm/Agilent). Calibration was carried out with narrow-range polystyrene standards from Polymer Laboratories with molecular weights of M=580 to M=7 500 000, and also hexylbenzene (M=162). The values outside the elution range were extrapolated.

The filtration which precedes the determination of molecular weight removes any gel fraction in the polymer, and so the figures reported relate to the sol fraction.

The insoluble fraction of the polymer can be determined by four-hour extraction with tetrahydrofuran in a Soxhlet apparatus, followed by drying of the residue to constant weight, and weighing of the residue that remains.

After the first stage, the monomers used have undergone reaction to an extent of at least 90%, preferably at least 95%, and more preferably at least 98%.

The monomer feed to the second stage and optionally further, subsequent stages is generally as follows:

(A2) 1% to 100%, preferably 2% to 95%, more preferably 5% to 90% by weight, very preferably 10% to 80% by weight, of at least one alkyl (meth)acrylate,
(B2) 0% to 70%, preferably 0% to 60%, more preferably 0% to 50% by weight of at least one vinylaromatic having up to 20 C atoms, (C2) 0% to 20%, preferably 0% to 15%, more preferably 0% to 10% by weight of at least one hydroxyalkyl (meth) acrylate, (D2) 0% to 40%, preferably 0% to 30%, more preferably 0% to 25%, and very preferably 0% to 20% by weight of at least one free-radically polymerizable compound selected from the group consisting of ethylenically unsaturated nitriles having up to 20 C atoms, vinyl esters of carboxylic acids comprising up to 20 C atoms, vinyl halides having up to 10 C atoms, and vinyl ethers of alcohols comprising 1 to 10 C atoms, and (E2) 0% to 5%, preferably 0% to 3%, more preferably 0% to 1%, very preferably 0% to 0.5%, and more particularly 0% by weight of at least one α,β-ethylenically unsaturated carboxylic acid, (F2) 0% to 3.5% by weight, preferably 0% to 2.5%, more preferably 0% to 1.5%, and very preferably 0% to 1% by weight of at least one crosslinker, and (G2) 0% to 10%, preferably 1% to 10%, more preferably 2% to 10%, very preferably 5% to 10% by weight, (H2) 0% to 20%, preferably 0% to 10%, more preferably 0% to 5%, and very preferably 0% by weight (I2) 0% to 20%, preferably 0% to 10%, more preferably 0% to 5%, and very preferably 0% by weight and the sum, based on the monomers metered into second and further stages, is always 100% by weight.

The weight ratio of the sum of the monomers of the first stage (A1) to (I1) to the sum of the monomers of the second and further stage (A2) to (I2) is from 5:95 to 70:30, preferably from 10:90 to 70:30, more preferably from 20:80 to 65:35, very preferably from 30:70 to 60:40, and more particularly from 40:60 to 60:40.

The second stage may optionally be followed by one or more stages of a free-radical polymerization with one or more of the monomers (A2) to (I2).

The product obtained from the last stage generally has a particle size of 50 to 300 nm, preferably of 60 to 250, more preferably of 70 to 200 nm if working in the presence of at least one emulsifier.

The particle size of the polymer obtained from the last stage may be up to 500 nm, preferably up to 400 nm, when operating in the abscence of emulsifiers.

The increase in particle diameter from first to second stage depends on the copolymerized monomer amounts in the first and seconds stages. In general the increase in particle diameter from first to second stage will be from 5% to 50%, preferably from 10% to 40%, more preferably from 20% to 35%, very preferably from 25% to 35%, and more particularly around 30%.

The product obtained from the last stage generally has a weight-average molecular weight Mw, based on the sol fraction, of 50 000 to 300 000 g/mol.

Generally speaking, the greater the amount of emulsifier present and the greater the amount of product from the first stage present, the smaller the particles of the product obtained from the last stage.

The polymer dispersions can be prepared in a conventional manner, in accordance with the emulsion polymerization processes that are common knowledge, from the monomers, using the customary emulsifying and dispersing assistants and polymerization initiators.

Dispersants contemplated for implementing free-radically aqueous emulsion polymerizations include typically employed emulsifiers in amounts of 0% to 3.5% by weight, preferably of 0% to 3% by weight, more preferably of 0.1% to 2%, very preferably of 0.1% to 1.5%, and more particularly 0.1% to 1% by weight, based on the total amount of the free-radically polymerizable monomers metered into the free-radical polymerization in all the stages. Preferably, at least one emulsifier is present.

Emulsifiers for the purposes of the present specification are those compounds which are capable of stabilizing a dispersion of an organic phase and an aqueous phase by reducing the interfacial tension between these phases.

Further customary emulsifiers are, for example, ammonium salts or alkali metal salts of $C_8$ to $C_{20}$ alkylsulfonates, sulfates, phosphonates, phosphates, and carboxylates, such as, for example, higher fatty alcohol sulfates such as Na n-lauryl sulfate, or of $C_8$ to $C_{20}$ alkylbenzenesulfonates, sulfates, phosphonates, phosphates, and carboxylates, and alkoxylated, preferably ethoxylated, $C_8$ to $C_{12}$ alkylphenols having a degree of ethoxylation of 3 to 30, and also alkoxylated, preferably ethoxylated, $C_8$ to $C_{25}$ fatty alcohols having a degree of ethoxylation of 5 to 50. These alkoxylated alcohols may also be in esterified form, as the sulfate, sulfonate, phosphate, polyphosphate or phosphonate, with ammonium ions or alkali metal ions as counterions.

Further suitable emulsifiers are listed in Houben-Weyl, Methoden der organischen Chemie, Volume XIV, Makromolekulare Stoffe [Macromolecular compounds], Georg Thieme Verlag, Stuttgart, 1961, pages 192 to 209.

With advantage, the emulsifiers used in accordance with the invention are ionic emulsifiers, more particularly anionic emulsifiers, or combinations thereof.

In one preferred embodiment the emulsifiers used are those which are incorporated into the polymer in the course of the free-radical polymerization. These are, generally, compounds which carry at least one free-radically polymerizable group, preferably selected from the group consisting of allyl, acrylate, methacrylate, and vinyl ether, and at least one emulsifying group, preferably selected from the group indicated above.

Examples of incorporable emulsifiers of this kind are those of the brand names Bisomer® MPEG 350 MA from Laporte, Hitenol® BC-20 (APEO), Hitenol® BC-2020, Hitenol® KH-10 or Noigen® RN-50 (APEO) from Dai-Ichi Kogyo Seiyaku Co., Ltd., Maxemul® 6106, Maxemul® 6112, Maxemul® 5010, Maxemul® 5011 from Croda, Sipomer® PAM 100, Sipomer® PAM 200, Sipomer® PAM 300, Sipomer® PAM 4000, Sipomer® PAM 5000 from Rhodia, Adeka® Reasoap® PP-70, Adeka® Reasoap® NE-10, Adeka® Reasoap® NE-20, Adeka® Reasoap® NE-30, Adeka® Reasoap® NE-40, Adeka® Reasoap® SE-10N, Adeka® Reasoap® SE-1025A, Adeka® Reasoap® SR-10, Adeka® Reasoap® SR-1025, Adeka® Reasoap® SR-20, Adeka® Reasoap® ER-10, Adeka® Reasoap® ER-20, Adeka® Reasoap® ER-30, Adeka® Reasoap® ER-40 from Adeka, Pluriol® A 010 R, Pluriol® A 12 R, Pluriol® A 23 R, Pluriol® A 46 R, Pluriol® A 750 R, Pluriol® A 950 R, Pluriol® A 590 I, Pluriol® A 1190I, Pluriol® A 590 V, Pluriol® A 1190 V, Pluriol® A 5890V, Pluriol® A 308 R, and DAA ES 8761 from BASF, Latemul® S 180 A and Latemul®S 180 from Kao, Eleminol® JS-2 from Sanyou Kasei, Aquaron® HS-1025 from Daiichi Kogyou Seiyaku, and C12-AMPS from Lubrizol.

Polymerization initiators contemplated include all those capable of triggering a free-radical emulsion polymerization in aqueous media. They are used generally in amounts of 0.1% to 10% by weight, preferably of 0.2% to 4% by weight, based on the monomers. Customary compounds are inorganic peroxides, examples being sodium and ammonium peroxodisulfate and hydrogen peroxide, organic peroxides such as dibenzoyl peroxide or tert-butyl hydroperoxide, and azo compounds such as azoisobutyrodinitrile. These initiators are suitable for the reaction temperatures of 50 to 100° C. that are customary for free-radical emulsion polymerizations. If lower reaction temperatures are desired, of 40 to 60° C., for instance, redox systems are preferred, such as combinations of peroxy compounds and a reducing coinitiator such as the sodium salt of hydroxymethanesulfinic acid, ascorbic acid or iron(II) salts.

The preparation of aqueous polymer dispersions by the process of free-radical emulsion polymerization is known per se (cf. Houben-Weyl, Methoden der organischen Chemie, Volume XIV, Makromolekulare Stoffe, loc. cit., pages 133ff).

A feed process has proven particularly appropriate, which starts from an initial charge consisting of a portion of the monomers, generally up to 20% by weight, water, emulsifier, and initiator. The remainder of the monomers and any regulators, in emulsified form, and also, in addition, an aqueous solution of further polymerization initiator, are added in line with the polymerization.

The monomers here may be divided between two or more feed streams, and may be provided with a variable metering rate and/or with a variable amount of one or more monomers.

In one possible embodiment, different degrees of crosslinking of the inner and outer regions may be produced, by leaving the concentration of monomers and crosslinkers in the reaction mixture largely constant, but varying the amount of regulator (chain transfer agent).

Through the presence of regulators in a polymerization, chain termination and the start of a new chain have the effect in general, through the new free radical thus produced, of lowering the molecular weight of the resultant polymer and, where crosslinkers are present, also lowering the number of crosslinking sites (crosslinking density). If the concentration of regulator is increased in the course of a polymerization, then the crosslinking density is further reduced in the course of the polymerization.

Molecular weight regulators of this kind are known, and may, for example, be mercapto compounds, such as, preferably, tertiary dodecyl mercaptan, n-dodecyl mercaptan, isooctylmercaptopropionic acid, mercaptopropionic acid, dimeric α-methylstyrene, 2-ethylhexyl thioglycolate (EHTG), 3-mercaptopropyltrimethoxysilane (MTMO) or terpinolene. The molecular weight regulators are known and are described in, for example, Houben-Weyl, Methoden der organischen Chemie, Volume XIV/1, p. 297 ff., 1961, Stuttgart.

In one preferred embodiment of the present invention, the polymerization may be carried out as described in EP 853 636 or in U.S. Pat. No. 3,804,881. The disclosure content of these two documents is hereby expressly incorporated by reference.

The aqueous polymer dispersions thus obtained preferably have a solids content of 35% to 65%, more preferably of 38% to 55%, by weight.

The polymer dispersions feature high stability, with virtually no coagulum formed. For a given hydroxyl number, given solids content, and given molecular weight, the polymer dispersions of the invention have a lower viscosity than comparable polymer dispersions not obtained in accordance with the invention.

The glass transition temperature, $T_g$, is preferably determined in this specification in accordance with ISO 11357-2-3-7, by way of differential scanning calorimetry (DSC), preferably with a heating rate of 20° C./min.

In one preferred embodiment, the copolymer obtained from the first stage has a glass transition temperature of 40 to 150° C., preferably 50 to 120° C., more preferably 50 to 100° C., and the product obtained from the last stage has a glass transition temperature which is lower by at least 40° C. Polymer dispersions of this kind can be used with advantage in coating compositions for the coating of substrates.

The minimum film-forming temperature (MFFT) of polymer dispersions of this kind that are used for coating compositions is advantageously not more than 5° C. In spite of this, the resulting films are not tacky.

The minimum film-forming temperature is determined by drawing down the dispersion onto a plate which is heated at one end and cooled at the other (DIN ISO 2115:2001-04). By means of visual assessment and temperature sensors at close intervals along the plate, the minimum film-forming temperature can be ascertained.

In another preferred embodiment, the copolymer obtained from the first stage has a glass transition temperature of not more than 0° C., preferably of 0 to –40° C. and more preferably of –5 to –25° C., and the product obtained from the last stage has a glass transition temperature of not more than 0° C., preferably of 0 to –40° C. and more preferably of –5 to –25° C. Polymer dispersions of this kind can be used with advantage as adhesives for the bonding of substrates. In the case of this utility, of course, the minimum film-forming temperature plays only a minor part.

The polymer dispersions can be used as binders for one-component or two-component coating compositions, such as for varnishes, protective coverings, traffic markings, decorative coverings, paints, and coatings.

For the different utilities it is possible to add suitable auxiliaries, examples being flow control agents, thickeners, defoamers, fillers, pigments, pigment dispersing assistants, etc.

The coatings may be obtained by applying the coating compositions to suitable substrates, such as wood, concrete, metal, glass, plastic, ceramics, plasters, stone, asphalt, textiles, or coated, primed or weathered substrates.

In the case of two-component coating compositions, a necessary further component is a crosslinker, which comprises, for example, the polyisocyanates known for these purposes to a skilled person.

Application to the substrate may take place in a known way, as for example by spraying, knifing, knifecoating, brushing, rolling, roller coating or pouring. The coating thickness is situated generally in a range from about 3 to 1000 g/m$^2$ and preferably 10 to 200 g/m$^2$. The volatile constituents of the dispersions are removed subsequently. This operation may be repeated one or more times if desired.

In order to remove the water present in the dispersion, application to the substrate is followed by drying, in a tunnel oven or by flashing, for example. Drying may also take place by means of NIR radiation, with NIR radiation referring here to electromagnetic radiation in the wavelength range from 760 nm to 2.5 μm, preferably from 900 to 1500 nm. Drying may take place at a temperature from ambient temperature to 100° C. over a period of a few minutes up to several days.

The polymer dispersion of the invention is, in one particular embodiment, especially suitable as a binder for varnishes and as a binder for paints.

In an anticorrosion coating utility, the polymer dispersion may be accompanied by anticorrosion agents, such as corrosion inhibitors or active anticorrosion pigments, e.g., zinc phosphate.

For corrosion control, the polymer dispersions are used to treat, as substrates, the surfaces of iron, steel, Zn, Zn alloys, Al or Al alloys. The surfaces may be uncoated, may be coated with zinc, aluminum or alloys thereof, may be hot dip galvanized, electroplated with zinc, sherardized, or precoated with primers.

Dispersion-based paints, also called emulsion paints, are one of the largest product groups in the paint and coatings industry (see Ullmanns Enzyklopädie der technischen Chemie, 4$^{th}$ edn., Volume 15, Verlag Chemie, Weinheim 1978, p. 665). Emulsion paints generally comprise a film-forming polymer binder and, as a coloring constituent, at least one inorganic pigment, and also inorganic fillers and auxiliaries, such as defoamers, thickeners, wetting agents, and—optionally—film-forming assistants.

Another important property of the polymer dispersions is the high blocking resistance of the paints, by which is meant little sticking of the paint film to itself under pressure load and at elevated temperature (good blocking resistance).

The paints (emulsion paints) of the invention comprise pigments and fillers preferably in amounts such that the pigment volume concentration (PVC) is 15% to 85% and more preferably 25% to 55%.

Typical pigments are exemplified by titanium dioxide, preferably in the rutile form, barium sulfate, zinc oxide, zinc sulfide, basic lead carbonate, antimony trioxide, lithopones (zinc sulfide+barium sulfate). However, the emulsion paints may also comprise colored pigments, examples being iron oxides, carbon black, graphite, luminescent pigments, zinc yellow, zinc green, ultramarine, manganese black, antimony black, manganese violet, Paris blue or Schweinfurt green. Besides the inorganic pigments, the emulsion paints of the invention may also comprise organic color pigments, examples being sepia, gamboge, Cassel brown, toluidine red, parared, Hansa yellow, indigo, azo dyes, anthraquinonoid and indigoid dyes, and also dioxazine, quinacridone, phthalocyanine, isoindolinone, and metal-complex pigments.

Suitable fillers include aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. The fillers can be used as individual components. In practice, however, filler mixtures have proven particularly appropriate, e.g., calcium carbonate/kaolin, calcium carbonate/talc.

In order to increase the hiding power and to save on the use of white pigments it is common to use finely divided fillers, examples being finely divided calcium carbonate or mixtures of different calcium carbonates with different particle sizes. For the adjustment of the hiding power of the hue and of the depth of color, it is preferred to employ blends of color pigments and fillers.

Additionally it is easily possible (by freeze or spray drying, for example) to obtain, from the aqueous polymer dispersions of the invention, the corresponding polymer powders. These inventively accessible polymer powders can likewise be employed as components in the production of adhesives, sealants, synthetic renders, paper-coating slips, fiber webs, painting materials and coating materials for organic substrates, and also for the modification of mineral binders.

The invention is to be illustrated using the following, non-limiting examples.

The solids content was determined generally by drying a defined amount of the aqueous polymer dispersion (approximately 1 g) to constant weight in a drying oven at 140° C., the dispersion being in an aluminum crucible having an internal diameter of approximately 5 cm. Two separate measurements were conducted. The figures reported in the examples represent the average of each pair of results.

The viscosity of the dispersions obtained was determined dynamically at 23° C. and a shear rate of 100 s$^{-1}$ in accordance with DIN EN ISO 3219.

Preparation of Aqueous Polymer Dispersions

EXAMPLE 1 (E1)

A polymerization vessel equipped with metering devices and temperature regulation was charged at 20 to 25° C. (room temperature) under a nitrogen atmosphere with
290.9 g of deionized water and
12.0 g of a 15% strength by weight aqueous solution of sodium lauryl sulfate,
and this initial charge was heated to 80° C. with stirring. When that temperature had been reached, 25.7 g of a 7% strength by weight aqueous solution of sodium peroxodisulfate were added and the batch was stirred for two minutes. Subsequently, with the temperature maintained, feed stream 1 was metered in continuously over the course of 40 minutes at a constant flow rate. After the end of feed stream 1, 12 g of water were added to the polymerization mixture. The polymerization mixture was then left to react at 80° C. for 10 minutes more. After that, it was admixed with 3.1 g of a 3% strength by weight aqueous ammonia solution.

Subsequently, feed stream 2 was metered in continuously over the course of 90 minutes with a constant flow rate.

After the end of feed stream 2, 12 g of water were added to the polymerization mixture. The polymerization mixture was then left to react at 80° C. for a further 100 minutes.

Thereafter the aqueous polymer dispersion obtained was cooled to room temperature, admixed with 62.9 g of deionized water, and filtered through a 125 μm filter.

Feed stream 1 (homogeneous mixture of):
76.2 g of deionized water
3.0 g of a 15% strength by weight aqueous solution of sodium lauryl sulfate
2.16 g of ethylhexyl thioglycolate
13.5 g of hydroxyethyl methacrylate
13.5 g of butyl acrylate
13.5 g of styrene
94.5 g of methyl methacrylate Feed stream 2 (homogeneous mixture of):
124.4 g of deionized water
6.0 g of a 15% strength by weight aqueous solution of sodium lauryl sulfate
157.5 g of n-butyl acrylate
157.5 g of methyl methacrylate The aqueous polymer dispersion obtained had a solids content of 42.5% by weight. The weight-average particle diameter of the polymer dispersion was 78 nm. The aqueous polymer dispersion obtained had a hydroxyl number of 6 mg KOH/g and an acid number of 0.3 mg KOH/g.

COMPARATIVE EXAMPLE 1 (C1)

The preparation of comparative example 1 was the same as for the preparation of example 1, with the difference that, in feed stream 1, 13.5 g of methacrylic acid were used in place of the hydroxyethyl methacryate, and that, instead of 3.1 g of a 3% strength by weight aqueous ammonia solution, 5.0 g of a 3% strength by weight aqueous ammonia solution were added.

The aqueous polymer dispersion obtained had a solids content of 42.6% by weight. The weight-average particle diameter of the polymer dispersion was 74 nm.

When a determination is made of the water absorption (immersion of the films in water over 24 h and determination of the change in weight) of the free films obtainable by pouring the dispersion into a rubber mold and drying it to constant weight at room temperature, it is found that the water absorption for example 1 is well below that of comparative example 1 (for C1, greater than 30%, based on the weight of the dry film; for B1, less than 10%, based on the weight of the dry film).

EXAMPLE 2 (E2)

A polymerization vessel equipped with metering devices and temperature regulation was charged at 20 to 25° C. (room temperature) under a nitrogen atmosphere with
289.6 g of deionized water and
12.0 g of a 15% strength by weight aqueous solution of sodium lauryl sulfate,
1.1 g of a 25% strength by weight aqueous ammonia solution and this initial charge was heated to 80° C. with stirring. When that temperature had been reached, 25.7 g of a 7% strength by weight aqueous solution of sodium peroxodisulfate were added and the batch was stirred for two minutes. Subsequently, with the temperature maintained, feed stream 1 was metered in continuously over the course of 40 minutes at a constant flow rate. After the end of feed stream 1, the polymerization mixture was left to react at 80° C. for 10 minutes more. After that, 13.5 g of a 2% strength by weight aqueous ammonia solution were metered continuously into the polymerization mixture over the course of 10 minutes at a constant flow rate.

Subsequently, feed stream 2 was metered in continuously over the course of 90 minutes with a constant flow rate.

After the end of feed stream 2, 12 g of water were added to the polymerization mixture. The polymerization mixture was then left to react at 80° C. for a further 100 minutes.

Thereafter the aqueous polymer dispersion obtained was cooled to room temperature, admixed with 57.8 g of an 18.7% strength by weight aqueous solution of adipic dihydrazide, and filtered through a 125 μm filter.

Feed stream 1 (homogeneous mixture of):
33.0 g of deionized water
3.0 g of a 15% strength by weight aqueous solution of sodium lauryl sulfate
2.16 g of ethylhexyl thioglycolate
54.0 g of a 20% strength by weight aqueous solution of diacetoneacrylamide
10.8 g butanediol monoacrylate
13.5 g of n-butyl acrylate
13.5 g of styrene
86.4 g of methyl methacrylate
Feed stream 2 (homogeneous mixture of):
116.5 g of deionized water
6.0 g of a 15% strength by weight aqueous solution of sodium lauryl sulfate
54.0 g of a 20% strength by weight aqueous solution of diacetoneacrylamide
217.8 g of n-butyl acrylate
86.4 g of methyl methacrylate The aqueous polymer dispersion obtained had a solids content of 42.5% by weight. The weight-average particle diameter of the polymer dispersion was 91 nm. The viscosity was found to be 39 mPas.

COMPARATIVE EXAMPLE 2 (C2)

A polymerization vessel equipped with metering devices and temperature regulation was charged at 20 to 25° C. (room temperature) under a nitrogen atmosphere with
289.6 g of deionized water and
12.0 g of a 15% strength by weight aqueous solution of sodium lauryl sulfate,
1.1 g of a 25% strength by weight aqueous ammonia solution and this initial charge was heated to 80° C. with stirring. When that temperature had been reached, 25.7 g of a 7% strength by weight aqueous solution of sodium peroxodisulfate were added and the batch was stirred for two minutes. Subsequently, with the temperature maintained, feed stream 1 was metered in continuously over the course of 150 minutes at a constant flow rate. After that, 13.5 g of a 2% strength by weight aqueous ammonia solution were metered continuously into the polymerization mixture over the course of 10 minutes at a constant flow rate.

Subsequently, 12 g of water were added to the polymerization mixture. The polymerization mixture was then left to react at 80° C. for a further 90 minutes.

Thereafter the aqueous polymer dispersion obtained was cooled to room temperature, admixed with 57.8 g of an 18.7% strength by weight aqueous solution of adipic dihydrazide, and filtered through a 125 μm filter.

Feed stream 1 (homogeneous mixture of):
149.5 g of deionized water
9.0 g of a 15% strength by weight aqueous solution of sodium lauryl sulfate
2.16 g of ethylhexyl thioglycolate
108.0 g of a 20% strength by weight aqueous solution of diacetoneacrylamide
10.8 g butanediol monoacrylate
231.3 g of n-butyl acrylate
13.5 g of styrene
172.8 g of methyl methacrylate The aqueous polymer dispersion obtained had a solids content of 42.6% by weight. The weight-average particle diameter of the polymer dispersion was 77 nm. The viscosity was found to be 75 mPas.

Using this polymer dispersion, in contrast to that prepared according to example 2, the only films obtained were hazy.

EXAMPLE 3 (E3)

A polymerization vessel equipped with metering devices and temperature regulation was charged at 20 to 25° C. (room temperature) under a nitrogen atmosphere with
290.9 g of deionized water and
14.4 g of Adeka® Reasoap® SR-1025 (Asahi Denka Co)
and this initial charge was heated to 80° C. with stirring. When this temperature had been reached, 25.7 g of a 7% strength by weight aqueous solution of sodium peroxodisulfate were added and the batch was stirred for two minutes. Subsequently, with the temperature maintained, feed stream 1 was metered in continuously over the course of 40 minutes with a constant flow rate. After the end of feed stream 1, 12.0 g of deionized water were added to the polymerization mixture. The polymerization mixture was then left to react at 80° C. for 10 minutes more. Thereafter, 1.9 g of a 3% strength by weight aqueous ammonia solution was metered continuously into the polymerization mixture over the course of 10 minutes at a constant flow rate.

Subsequently, over the course of 90 minutes and with a constant flow rate, feed stream 2 was metered in continuously. 40 minutes after the start of feed stream 2, and in parallel with the ongoing feed stream 2, 0.9 g of a 3% strength by weight aqueous ammonia solution were metered continuously into the polymerization mixture over the course of 10 minutes at a constant flow rate.

After the end of feed stream 2, 12 g of water were added to the polymerization mixture. The polymerization mixture was then left to react at 80° C. for 90 minutes more. Thereafter, 1.7 g of a 5% strength by weight aqueous ammonia solution were metered continuously into the polymerization mixture over the course of 10 minutes at a constant flow rate.

Subsequently, the aqueous polymer dispersion obtained was cooled to room temperature, admixed with 40.9 g of 13.2% strength by weight aqueous solution of adipic dihydrazide, and filtered through a 125 µm filter.

Feed stream 1 (homogeneous mixture of):
33.1 g of deionized water
3.6 g of Adeka® Reasoap® SR-1025 (Asahi Denka Co)
2.16 g of ethylhexyl thioglycolate
54.0 g of a 20% strength by weight aqueous solution of diacetoneacrylamide
10.8 g of hydroxyethyl methacrylate
13.5 g of styrene
99.9 g of methyl methacrylate
Feed stream 2 (homogeneous mixture of):
162.8 g of deionized water
7.2 g of Adeka® Reasoap® SR-1025 (Asahi Denka Co)
217.8 g of n-butyl acrylate
97.2 g of methyl methacrylate The aqueous polymer dispersion obtained had a solids content of 42.6% by weight. The weight-average particle diameter of the polymer dispersion was 97 nm. The viscosity was found to be 42 mPas.

EXAMPLE 4 (E4)

A polymerization vessel equipped with metering devices and temperature regulation was charged at 20 to 25° C. (room temperature) under a nitrogen atmosphere with
493.5 g of deionized water and
9.0 g of BASF Lipamin OK
and this initial charge was heated to 70° C. with stirring. When that temperature had been reached, 154.3 g of a 7% strength by weight aqueous solution of Azostarter V50 azo initiator (from Wacker Chemicals GmbH) were added and the batch was stirred for five minutes.

Subsequently, with the temperature maintained, feed stream 1 was metered in continuously over the course of 40 minutes at a constant flow rate. After the end of feed stream 1, 24.0 g of deionized water were added to the polymerization mixture. The polymerization mixture was then left to react at 70° C. for 20 minutes more.

Subsequently, feed stream 2 was metered in continuously over the course of 90 minutes with a constant flow rate.

After the end of feed stream 2, 24 g of water were added to the polymerization mixture. The polymerization mixture was then left to react at 70° C. for a further 100 minutes.

Thereafter the aqueous polymer dispersion obtained was cooled to room temperature, admixed with 115.5 g of an 18.7% strength by weight aqueous solution of adipic dihydrazide, and filtered through a 125 µm filter.

Feed stream 1 (homogeneous mixture of):
66.0 g of deionized water
2.25 g of BASF Lipamin® OK
4.32 g of ethylhexyl thioglycolate
108.0 g of a 20% strength by weight aqueous solution of diacetoneacrylamide
21.6 g of butanediol monoacrylate
27.0 g of styrene 172.8 g of methyl methacrylate
Feed stream 2 (homogeneous mixture of):
285.9 g of deionized water
4.5 g of BASF Lipamin® OK
108.0 g of a 20% strength by weight aqueous solution of diacetoneacrylamide
435.6 g of n-butyl acrylate
172.8 g of methyl methacrylate The aqueous polymer dispersion obtained had a solids content of 41.6% by weight. The weight-average particle diameter of the polymer dispersion was 140 nm. The viscosity was found to be 10 mPas.

EXAMPLE 5 (E5)

The preparation of example 5 was as for the preparation of example 1, with the differences that, in feed stream 1, 85.5 g of n-butylacrylate instead of 13.5 g of n-butylacrylate, and 14.4 g of methyl methacrylate instead of 86.4 g of methyl methacrylate, were used; that, instead of 57.8 g of an 18.7% strength by weight aqueous solution of adipic dihydrazide, 45.0 g of a 12% strength by weight aqueous solution of adipic dihydrazide were used; and that feed stream 2 was composed of a homogeneous mixture of:
159.7 g of deionized water
6.0 g of a 15% strength by weight aqueous solution of sodium lauryl sulfate
315.0 g of ethylhexyl acrylate.

The aqueous polymer dispersion obtained had a solids content of 40.2% by weight. The weight-average particle diameter of the polymer dispersion was 93 nm. The viscosity of the resulting polymer dispersion was 73 mPas. Application of the dispersion, for example, by knifecoating to a glass plate (using a four-way bar-type applicator, wet film thickness 200 µm) and drying at room temperature for 24 hours produced a tacky film.

EXAMPLE 6 (E6)

The preparation of example 6 was as for the preparation of example 3, with the differences that, in the initial charge, 12.0 g of a 15% strength by weight aqueous solution of sodium lauryl sulfate instead of 14.4 g of Adeka® Reasoap® SR-1025, were used; that, instead of 40.9 g of a 13.2% strength by weight aqueous solution of adipic dihydrazide, 48.1 g of a 26.2% strength by weight aqueous solution of adipic dihydrazide were used; and that feed stream 1 was composed of a homogeneous mixture of:
77.0 g of deionized water
6.9 g of a 15% strength by weight aqueous solution of sodium lauryl sulfate
126.0 g of a 20% strength by weight aqueous solution of diacetoneacrylamide
9.0 g of methacrylamide
25.2 g of hydroxyethyl methacrylate
22.5 g of styrene
233.1 g of methyl methacrylate
and feed stream 2 was composed of a homogeneous mixture of:
64.6 g of deionized water
2.7 g of a 15% strength by weight aqueous solution of sodium lauryl sulfate
135.0 g of n-butyl acrylate In addition, as a further difference, feed stream 1 was metered in at a uniform rate over 90 min rather than 40 min, and feed stream 2 was metered in at a uniform rate over 40 min rather than 90 min. The additions of 12.0 g of deionized water each took place following the ends of feed streams 1 and 2, while the addition of the aqueous ammonia solution took place at the same distance from the beginning of the reaction as in example 3.

The aqueous polymer dispersion obtained had a solids content of 42.4% by weight. The weight-average particle diameter of the polymer dispersion was 99 nm. The viscosity of the resulting polymer dispersion was 39 mPas.

EXAMPLE 7 (E7)

The preparation of example 7 was as for the preparation of example 6, with the differences that, in the initial charge, 6.0 g of a 15% strength by weight aqueous solution of sodium lauryl sulfate instead of 12.0 g of a 15% strength by weight aqueous solution of sodium lauryl sulfate, were used; that, in feed stream 2, 71.6 g of deionized water were used instead of 64.6 g, and 1.35 g of a 15% strength by weight aqueous solution of sodium lauryl sulfate instead of 2.7 g were used; and that feed stream 1 was composed of a homogeneous mixture of:
77.0 g of deionized water
3.45 g of a 15% strength by weight aqueous solution of sodium lauryl sulfate
126.0 g of a 20% strength by weight aqueous solution of diacetoneacrylamide
45.0 g of hydroxyethyl methacrylate
11.7 g of styrene
233.1 g of methyl methacrylate The aqueous polymer dispersion obtained had a solids content of 42.7% by weight. The weight-average particle diameter of the polymer dispersion was 102 nm. The viscosity of the resulting polymer dispersion was 23 mPas.

EXAMPLE 8 (E8)

The preparation of example 8 took place in the same way as the preparation of example 3, with the difference that feed stream 1 was composed of a homogeneous mixture of:
33.0 g of deionized water
3.0 g of a 15% strength by weight aqueous solution of sodium lauryl sulfate
2.16 g of ethylhexyl thioglycolate
54.0 g of a 20% strength by weight aqueous solution of diacetoneacrylamide
21.6 g of hydroxyethyl methacrylate
18.0 g of glycidyl methacrylate
13.5 g of styrene
71.1 g of methyl methacrylate A sample taken revealed that the product of the first stage had a weight-average molecular weight Mw of 13 900 g/mol and a weight-average particle diameter of 60 nm.

And feed stream 2 was composed of a homogeneous mixture of:
159.7 g of deionized water
6.0 g of a 15% strength by weight aqueous solution of sodium lauryl sulfate
315.0 g of n-butyl acrylate The aqueous polymer dispersion obtained had a solids content of 43.1% by weight. The weight-average particle diameter of the polymer dispersion was 143 nm. The viscosity of the polymer dispersion obtained was 21 mPas. The polymer dispersion obtained had a weight-average molecular weight, based on the sol fraction, of approximately 204 000 g/mol.

EXAMPLE 9 (E9)

The preparation of example 9 took place as for the preparation of example 8, with the difference that, in feed stream 1, 21.6 g of hydroxyethyl acrylate were used instead of 21.6 g of hydroxyethyl methacrylate.

The aqueous polymer dispersion obtained had a solids content of 42.9% by weight. The weight-average particle diameter of the polymer dispersion was 153 nm. The viscosity of the polymer dispersion obtained was 22 mPas.

EXAMPLE 10 (E10)

The preparation of example 10 took place in the same way as for the preparation of example 8, with the difference that feed stream 1 was composed of a homogeneous mixture of:
5.5 g of deionized water
0.51 g of a 15% strength by weight aqueous solution of sodium lauryl sulfate
0.36 g of ethylhexyl thioglycolate
9.0 g of a 20% strength by weight aqueous solution of diacetoneacrylamide
1.8 g of hydroxyethyl methacrylate
1.5 g of glycidyl methacrylate
2.25 g of styrene
15.2 g of methyl methacrylate
and feed stream 2 was composed of a homogeneous mixture of:
214.8 g of deionized water
8.1 g of a 15% strength by weight aqueous solution of sodium lauryl sulfate
427.5 g of n-butyl acrylate In addition, as a further difference, feed stream 1 was metered in at a uniform rate over 5 minutes rather than 40 minutes, and feed stream 2 was metered in at a uniform rate over 125 minutes rather than 90 minutes. The additions of the 12.0 g of deionized water each took place following the ends of feed streams 1 and 2, and the additions of the aqueous ammonia solution took place at the same distance from the beginning of the reaction as in example 3, and, furthermore, instead of 40.9 g of a 13.2% strength by weight aqueous solution of adipic dihydrazide, 36.4 g of a 2.5% strength by weight aqueous solution of adipic dihydrazide were used.

The aqueous polymer dispersion obtained had a solids content of 43.0% by weight. The weight-average particle diameter of the polymer dispersion was 128 nm. The viscosity of the polymer dispersion obtained was 23 mPas.

The invention claimed is:

1. A coating composition comprising at least one polymer dispersion obtained by at least two-stage emulsion polymerization of,
   in a first reaction stage
   (A1) at least one alkyl (meth)acrylate,
   (B1) optionally at least one vinylaromatic having up to 20 C atoms,
   (C1) at least one hydroxyalkyl (meth)acrylate,
   (D1) optionally at least one free-radically polymerizable compound selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms,
   (E1) optionally at least one α,β-ethylenically unsaturated carboxylic acid,
   (F1) optionally at least one crosslinker,
   (G1) optionally at least one compound selected from the group consisting of 2-(2-oxoimidazolidin-1-yl)ethyl (meth)acrylate, ureidoethyl (meth)acrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide, (H1) optionally at least one compound having a (meth)acrylate group and an epoxy group, and
(I1) optionally at least one α,β-ethylenically unsaturated carboxamide,
in the presence of at least one initiator and optionally in the presence of at least one emulsifier and also, optionally, in the presence of at least one regulator wherein a copolymer is obtained,
with the proviso that said copolymer obtained from the first stage has
an acid number of not more than 10 mg KOH/g polymer,
a hydroxyl number of 2 to 100 mg KOH/g polymer,
a particle size of 20 to 300 nm, and
a weight-average molecular weight of 5000 to 200 000 g/mol,
and the sum of the monomers (C1) and (I1) in said first stage is from 0.5% to 20% by weight,
followed by a free-radical polymerization, in a subsequent stage, in the presence of the copolymer prepared in the first stage, of
(A2) at least one alkyl (meth)acrylate,
(B2) optionally at least one vinylaromatic having up to 20 C atoms,
(C2) optionally at least one hydroxyalkyl (meth)acrylate,
(D2) optionally at least one free-radically polymerizable compound selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms,
(E2) optionally at least one α,β-ethylenically unsaturated carboxylic acid,
(F2) optionally at least one crosslinker, and
(G2) optionally at least one compound selected from the group consisting of 2-(2-oxoimidazolidin-1-yl)ethyl (meth)acrylate, ureidoethyl (meth)acrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide,
(H2) optionally at least one compound having a (meth)acrylate group and an epoxy group, and
(I2) optionally at least one α,β-ethylenically unsaturated carboxamide,
optionally followed by one or more further stages of a free-radical polymerization of at least one monomer,
the amount of the optional at least one emulsifier being 0% to 3.5% by weight, based on the total amount of the free-radically polymerizable monomers metered into the free-radical polymerization in all the stages,
with the proviso that
the weight ratio of the sum of the monomers of the first stage (A1) to (I1) to the sum of the monomers of the subsequent stages (A2) to (I2) is from 5:95 to 70:30,
the product obtained from a last stage has a particle size of 50 to 500 nm,
the acid number of the product of the last stage is not higher than the acid number of the product of the first stage, and
the hydroxyl number of the product of the last stage is not higher than the hydroxyl number of the product of the first stage.

2. The coating composition according to claim 1, wherein the monomer (A2) is at least one monomer selected from the group consisting of methyl methacrylate, methyl acrylate, ethyl acrylate, n-butyl acrylate, 2-ethylhexyl acrylate, and 3-propylheptyl acrylate.

3. The coating composition according to either of the preceding claims, wherein the monomer (B2) is at least one monomer selected from the group consisting of styrene and α-methylstyrene.

4. The coating composition according to claim 1, wherein the monomer (C1) is at least one monomer selected from the group consisting of 2-hydroxyethyl (meth)acrylate, 2-hydroxypropyl (meth)acrylate, and 3-hydroxypropyl (meth)acrylate.

5. The coating composition according to claim 1, wherein a monomer (G1) is present and it is diacetoneacrylamide.

6. The coating composition according to claim 1, wherein an emulsifier is present and said emulsifier is an ionic emulsifier.

7. The coating composition according to claim 1, having a minimum film-forming temperature of not more than 5° C.

8. The coating composition according to claim 1, wherein the copolymer obtained from the first stage has a glass transition temperature of 40 to 150° C., and the product obtained from said subsequent stage has a glass transition temperature which is lower by at least 40° C.

9. The coating composition according to claim 1, wherein the copolymer obtained from the first stage has a glass transition temperature of not more than 0° C., and the product obtained from said subsequent stage has a glass transition temperature of not more than 0° C.

10. A process for preparing the coating composition according to claim 1 comprising preparing a polymer dispersion, which comprises carrying out
an at least two-stage emulsion polymerization,
in which, in a first stage, the reaction of
(A1) at least one alkyl (meth)acrylate,
(B1) optionally at least one vinylaromatic having up to 20 C atoms,
(C1) at least one hydroxyalkyl (meth)acrylate,
(D1) optionally at least one free-radically polymerizable compound selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms,
(E1) optionally at least one α,β-ethylenically unsaturated carboxylic acid,
(F1) optionally at least one crosslinker,
(G1) optionally at least one compound selected from the group consisting of 2-(2-oxoimidazolidin-1-yl)ethyl (meth)acrylate, ureidoethyl (meth)acrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide,
(H1) optionally at least one compound having a (meth)acrylate group and an epoxy group, and
(I1) optionally at least one α,β-ethylenically unsaturated carboxamide,
in the presence of at least one initiator and optionally in the presence of at least one emulsifier and also, optionally, in the presence of at least one regulator wherein a copolymer is obtained,
with the proviso that said copolymer obtained from the first stage has
an acid number of not more than 10 mg KOH/g polymer,
a hydroxyl number of 2 to 100 mg KOH/g polymer,
a particle size of 20 to 300 nm, and
a weight-average molecular weight of 5000 to 200 000 g/mol, and the sum of the monomers (C1) and (I1) in said first stage is from 0.5% to 20% by weight, followed by a free-radical polymerization, in a subsequent stage, in the presence of the copolymer prepared in the first stage, of
(A2) at least one alkyl (meth)acrylate,
(B2) optionally at least one vinylaromatic having up to 20 C atoms,
(C2) optionally at least one hydroxyalkyl (meth)acrylate,
(D2) optionally at least one free-radically polymerizable compound selected from the group consisting of ethylenically unsaturated nitriles having up to 20 C atoms, vinyl esters of carboxylic acids comprising up to 20 C atoms, vinyl halides having up to 10 C atoms, and vinyl ethers of alcohols comprising 1 to 10 C atoms,
(E2) optionally at least one α,β-ethylenically unsaturated carboxylic acid,
(F2) optionally at least one crosslinker; and
(G2) optionally at least one compound selected from the group consisting of 2-(2-oxoimidazolidin-1-yl)ethyl (meth)acrylate, ureidoethyl (meth)acrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide,
(H2) optionally at least one compound having a (meth)acrylate group and an epoxy group, and
(I2) optionally at least one α,β-ethylenically unsaturated carboxamide,
optionally followed by one or more further stages of a free-radical polymerization of at least one monomer, the amount of the optional at least one emulsifier being 0% to 3.5% by weight, based on the total amount of the free-radically polymerizable monomers metered into the free-radical polymerization in all the stages, with the proviso that
the weight ratio of the sum of the monomers of the first stage (A1) to (I1) to the sum of the monomers of the subsequent stages (A2) to (I2) is from 5:95 to 70:30,
the product obtained from the last stage has a particle size of 50 to 500 nm,
the acid number of the product of the last stage is not higher than the acid number of the product of the first stage, and
the hydroxyl number of the product of the last stage is not higher than the hydroxyl number of the product of the first stage.

11. A method of coating comprising applying the coating composition according to claim 8 to at least one surface selected from the group consisting of plastic, wood, paper and metal.

12. A method of adhering comprising applying the coating composition according to claim 9, to a surface.

13. The coating composition according to claim 1, wherein a particle size of said copolymer obtained from said first stage is 30 to 300 nm.

14. The coating composition according to claim 1, wherein an emulsifier is used and said emulsifier is an anionic emulsifier.

* * * * *